United States Patent [19]
Marshall

[11] Patent Number: 5,954,468
[45] Date of Patent: Sep. 21, 1999

[54] HAY BALE LOADING TRAILER

[76] Inventor: Mitchell B. Marshall, Rte. 2, Box 66, Headland, Ala. 36345

[21] Appl. No.: 08/898,019

[22] Filed: Jul. 22, 1997

[51] Int. Cl.⁶ .................................................. B60P 1/16
[52] U.S. Cl. ........................ 414/24.5; 414/482; 414/551; 414/911
[58] Field of Search ................... 414/24.5, 24.6, 414/546, 551, 685, 911, 482, 483, 484, 485, 436, 469

[56] References Cited

U.S. PATENT DOCUMENTS

| | | |
|---|---|---|
| 3,877,595 | 4/1975 | Edelman . |
| 3,935,954 | 2/1976 | Woods et al. ........................... 414/24.5 |
| 3,944,095 | 3/1976 | Brown . |
| 4,040,531 | 8/1977 | Cross . |
| 4,044,907 | 8/1977 | Craft . |
| 4,044,967 | 8/1977 | Guichon ............................. 414/911 X |
| 4,062,454 | 12/1977 | Priefert .................................... 414/24.5 |
| 4,126,234 | 11/1978 | Wells ...................................... 414/24.5 |
| 4,297,065 | 10/1981 | Love ....................................... 414/24.5 |
| 4,326,827 | 4/1982 | McNutt ................................. 414/24.5 |
| 4,579,497 | 4/1986 | Nine ....................................... 414/24.5 |
| 4,944,648 | 7/1990 | Parr ...................................... 414/482 X |
| 4,981,407 | 1/1991 | Johnson ................................ 414/24.5 |
| 5,135,343 | 8/1992 | Wigness ................................ 414/24.5 |
| 5,257,885 | 11/1993 | Reil ...................................... 414/482 X |
| 5,383,714 | 1/1995 | Hunter .................................. 298/17 R |
| 5,496,144 | 3/1996 | Wetz ....................................... 414/24.5 |
| 5,584,639 | 12/1996 | Walker, Jr. .......................... 414/482 X |

*Primary Examiner*—Janice L. Krizek
*Attorney, Agent, or Firm*—Robert N. Blackmon

[57] ABSTRACT

The present invention involves a loading hay bale trailer. The trailer comprises (a) a carriage having (i) a frame, (ii) axles and (iii) wheels, (b) a pivotal cradle attached to the frame, the carriage having (i) a back section and (ii) tines, (c) a device for forcibly pivoting the cradle. The trailer may be loaded by lowering the tines to the ground level, forcing the tines under the bale, pivoting the cradle to roll the ball onto the elbow section, and transporting the bale.

5 Claims, 3 Drawing Sheets

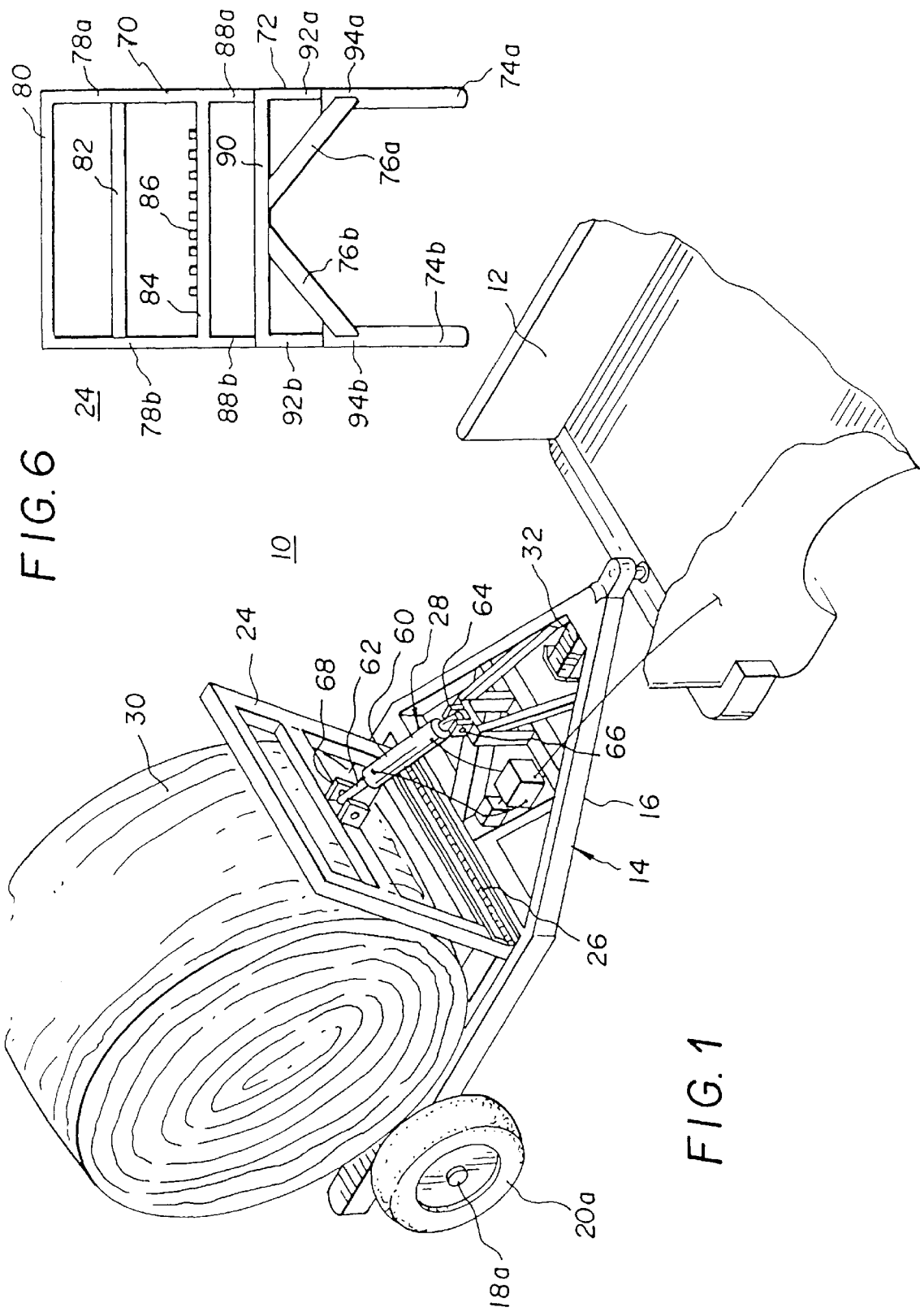

HAY BALE LOADING TRAILER

BACKGROUND OF THE INVENTION

1. Field of the Invention

The present invention relates to the field of hay bale transport trailers, and more particularly relates to trailers having self-loading/unloading capabilities.

2. Description of the Related Art

Various self-loading trailers, truck dump beds and hay balers have been disclosed, see for example Wetz U.S. Pat. No. 5,496,144 issued Mar. 5, 1996, Hunter U.S. Pat. No. 5,383,714 issued Jan. 24, 1995, Wigness U.S. Pat. No. 5,135,343 issued Aug. 4, 1992, Nine U.S. Pat. No. 4,579,497 issued Apr. 1, 1986, Edelman U.S. Pat. No. 3,877,595 issued Apr. 15, 1975, McNutt U.S. Pat. No. 4,326,827 issued Apr. 27, 1982, all of which are incorporated herein by reference. These prior trailers have typically suffered from one or more of the following problems or disadvantages: (1) the use of a cable which needs to be placed about the bale of hay requiring manual effort for placement, (2) the use of an arcuate bale member to extend over the periphery of the bale requiring the bale be approached from a predetermined direction, (3) the use of clamp arms requiring the bale be approached from a given direction having the center of gravity of the bale originally disposed considerably to the rear of cradle tines, (4) the use of a stabber requiring the bale be approached from a given direction, (5) the use of a bale axle retaining collar requiring manual effort for use and requiring that the bale be approached from a given direction, and (6) the use of a dump bed requiring the use of a modified vehicle rather than a conventional pick up truck.

Consequently, there is a need for a bale loading trailer that can be used to load large round bales of hay regardless of the direction of approach to the bale and without the need for substantial manual labor during loading and unloading.

SUMMARY OF THE INVENTION

The present invention involves a loading hay bale trailer. The trailer comprises (a) a carriage having (i) a frame,(ii) axles attached to the frame, and (iii) wheels attached to the axles, (b) a pivotal cradle attached to and carried by the frame, the carriage having (i) a back section, (ii) preferably, an elbow section, and (iii) tines, (c) means for forcibly pivoting the cradle. The trailer may be loaded by lowering the tines to the ground level, forcing the tines under the bale, pivoting the cradle to roll the bale onto the elbow section, and transporting the bale.

BRIEF DESCRIPTION OF THE INVENTION

FIG. 1 is a perspective view of the trailer of the present invention attached to a pickup truck and having a bale on the trailer;

FIG. 6 is a top plan view of a cradle of a trailer according to the present invention.

DETAILED DESCRIPTION OF THE INVENTION

Figure 2:
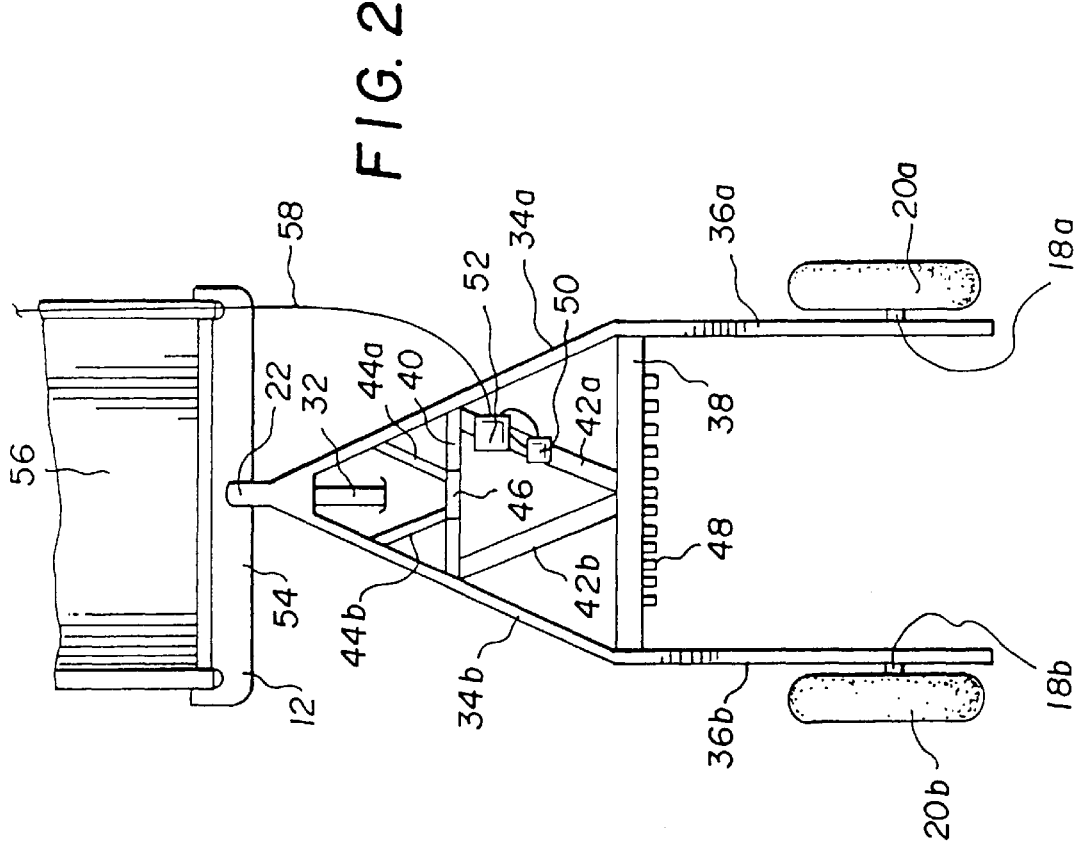
FIG. 2 is a top plan view of the trailer of the present invention or the cradle removed therefrom.

As best shown in FIG. 1, a hay bale loading trailer (10) according to the present invention is attached to a pickup truck (12). The trailer (10) comprises a carriage (14) which comprises (i) a frame (16), (ii) axles (18a,b) attached to the frame (16), (iii) wheels (20a,b) attached to the axles (18a,b respectively) and a hitch (22) (any conventional hitch is suitable such as a ball hitch or a step hitch), as best shown in FIG. 2. The wheels (20a,b) provide for movability of the trailer (10) and are attached to the frame (16) by the axles (18a,b). The hitch (22) allows for easy attachment of the trailer (10) to the hitching ball (not shown) on the bumper (54) of the pickup (12). The trailer (10) further compromises a cradle (24) which is pivotally carried on the carriage (14). The cradle (24) is pivotally attached to the frame (16) by a hinge (26). The cradle may be forcibly moved about the hinge (26) by means (28) for forcing the cradle about the hinge (26). The trailer (10) is designed for easy loading, transport and unloading of a bale (30), and does not require (may be free of) conventional restraining devices such as straps, grabbing pins (elements) or chains. Preferably the carriage (14) includes a pivotal jack (32) which can be rotated from a horizontal position as shown in FIG. 1 for transport of the trailer (10) or moved to a vertical position (not shown) for parking of the trailer (10) in an unused position.

As best shown in FIG. 2, the carriage (14) is shown with the cradle (24) having been removed. The frame (16) has a pair of horizontal lateral frame members (34a,b) that diverge rearwardly from the front-most hitch (22) (extend rearwardly and outwardly) approximately half the length of the frame (16) and are attached to (welded to) respective rear frame members (36a,b) which extend rearwardly from the rearmost ends of the lateral frame members (34a,b). A rear cross member (38) extends between the front-most portions of the rear frame members (36a,b), and a front cross member (40) extends across (between) the lateral frame members (34a,b) at midsections of the lateral frame members (34a,b). Rear brace members (42a,b) extend rearwardly and inwardly from ends of the front cross member (40) to the midsection of the rear cross member (38) for providing rigid structural support to the carriage (14). Front brace members (44a,b) extend rearwardly, inwardly and upwardly from front portions of the lateral frame members (34a,b) to a base structure (46). The base structure (46) (square shaped) is supported on the front cross member (40) and extends upwardly therefrom. Hinge loops (48) extend upwardly and rearwardly from the rear cross member (38) for a pivotable attachment of the cradle (24) to the frame (16).

Figure 3:
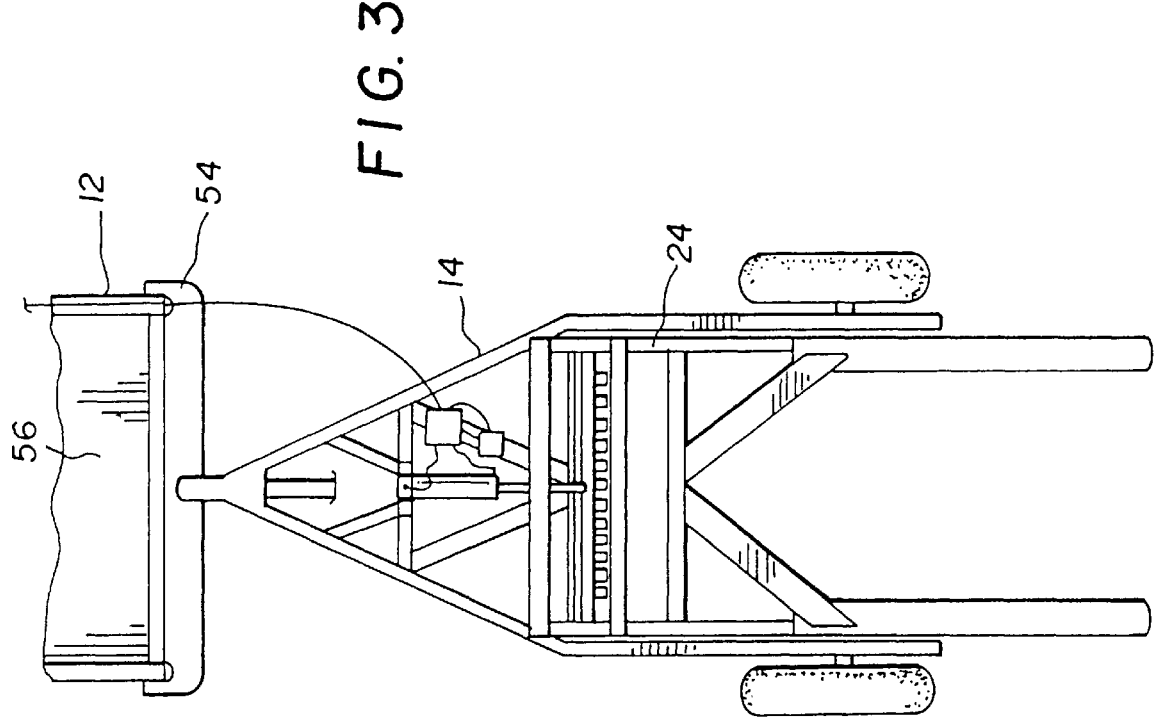
FIG. 3 is a top plan view of a trailer according to the present invention attached to a pickup truck.
Figure 4:
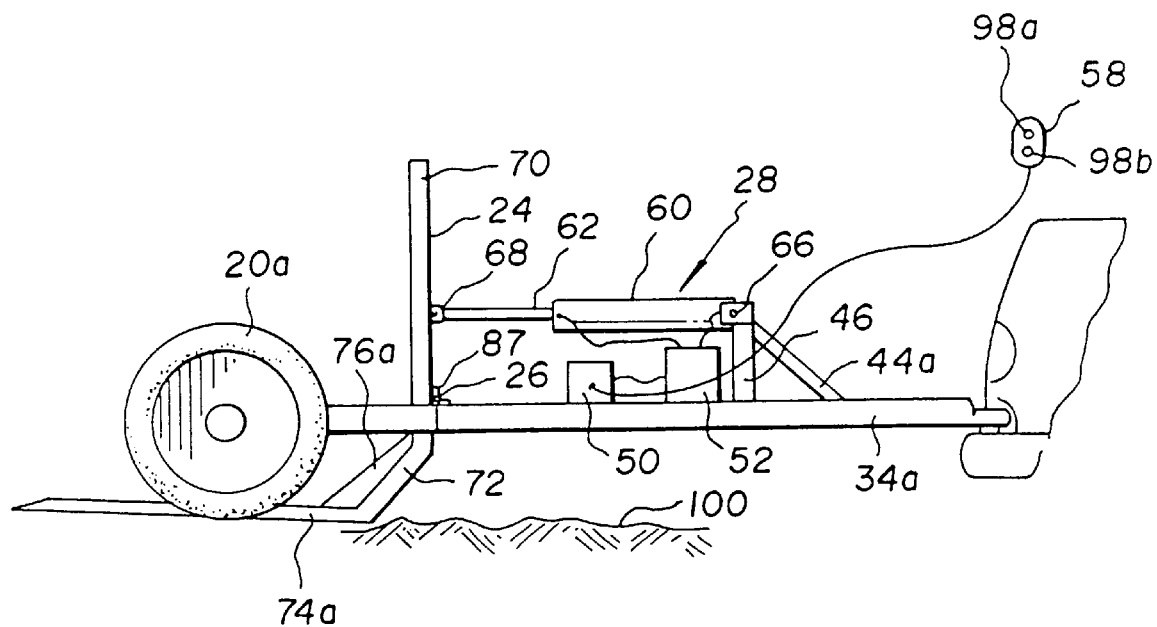
FIG. 4 is a side elevational view of a trailer according to the present invention attached to a pickup truck and having the cradle in its lowered position.
Figure 5:
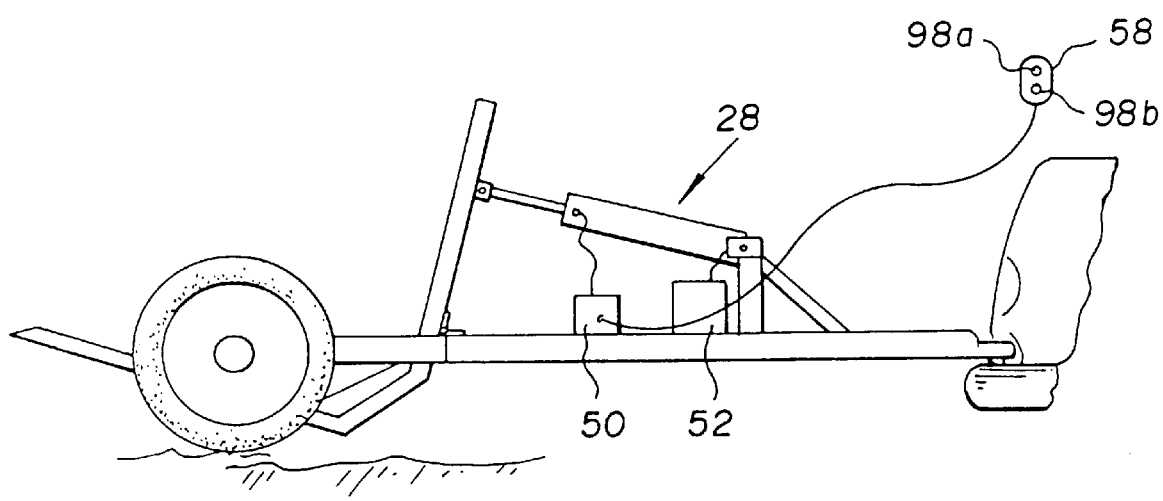
FIG. 5 is a side elevational view of a trailer according to the present invention with the cradle in its bale transporting position.

As can be seen from FIGS. 3, 4, and 5 the forcing means (28) includes a motor (50) and a hydraulic pump (52) for use in combination with a cylinder (60) and piston (62) as well as a control (58). As also shown in FIG. 2, the wheel (20a) is attached to the rear frame member (36a) by axle (18a); and the wheel (20b) is attached to the rear frame member (36b) by the axle (18b).

The trailer as shown in FIG. 3 extends rearwardly from the bumper (54) of the pickup (12) which is the rear of the truck bed (56).

As shown in FIG. 4, a control (58) may be used to actuate the motor (50) which in turn drives a pump (52). The control (58) has an out button (98a) and an in button (98b) for controlling whether the piston (62) extends inwardly or outwardly from the cylinder (60) for controlling movement of the cradle about the hinge (26). As can be seen from FIG.

4, the front brace members (44a,b) extend from the lateral frame members (34a,b) to the top of the base structure (46) for providing rigid support thereto. The base member (46) has extending rearwardly therefrom an extension arm (64) which is rigidly attached to the base member. The extension (64) has a pivot pin (66) which allows the cylinder (60) to be pivoted about the pivot pin (66) during movement of the cradle. The rearward end of the piston (62) is attached to a pivot pin (68) which is attached to the cradle (24) for permitting relative pivotal movement of the piston (62) relative to the cradle (24). As can be shown from FIG. 4, the cradle is in its loading position wherein the hay bale (30) can be easily loaded into the cradle (24) by backing the pickup (12) rearwardly to force the bale (30) onto the cradle (24).

As best shown in FIG. 6, the cradle (24) comprises a back section (70), an elbow section (72) and tines (74a,b). When the hay bale (30) is being loaded (the cradle is in the loading position), the back section (70) extends upwardly and substantially vertically; the elbow section (72) extends downwardly and rearwardly from the bottom of the back section (70) to substantially the ground level (the level of the bottom of the wheels (20), in engagement with the ground and level with the ground level); and the tines (74a,b) extend substantially horizontally and rearwardly from the lowermost rearmost portion of the elbow section (72). Tine braces (76a,b) rearwardly and inwardly extend from the front-most region of the tines (74a,b) respectively to a midportion of an elbow cross member (90).

The back section (70) has a pair of parallel side members (78a,b) which are spaced apart and which have extending therebetween a top (horizontal) cross member (80) at the uppermost regions thereof, and have extending therebetween a middle (horizontal) cross member (82) extending across upper midsection regions of the side members (78a, b). The back section further comprises a bottom (horizontal) cross member (84) which extends between the side members (78a,b) at a position lower than the middle cross member and preferably extending between lower mid-regions of the side members (78a,b). Hinge loops (86) extend upwardly and rearwardly from the bottom cross member (84) for attachment of the cradle to the frame by positioning of the hinge loops (86) adjacent the hinge loops (48) for mutual receipt of a common hinge rod (87). The side members (78a,b) further respectively have lowermost (extended) portions (88a,b) which extend beyond the bottom cross member (84). A (horizontal) elbow cross member (90) extends between and from the lowermost ends of the portions (88a,b). When in the loading position, the elbow section (72) extends downwardly and rearwardly from the bottom of the side members (78a,b) and when in the transport position as shown in FIG. 5, the elbow section (72) will be substantially horizontal. The elbow section (72) as best shown in FIG. 6, has side elements (92a,b) which extend from the elbow cross member (90) and are spaced apart from each other. The tines (74a,b) extend from the respective side elements (92a,b). The tine braces (76a,b) extend outwardly from a mid-region of the elbow cross member (90) to rear regions (94a,b) of the tines (74a,b).

In use (operation) a hay bale (30) may be approached and then as shown in FIG. 4, the cradle may be rotated downwardly until the tines (74a,b) engage (become parallel with, level with )the ground (100). The trailer may be then backed up by operation of the pickup truck (12) to force at least a portion of the tines (74a,b) underneath the round bale regardless of whether approached from a direction of an end of the bale or from the front or back of the bale. Once the tines are positioned underneath the bale, the operator of the truck may then utilize the control (58) by actuating the in button (98b) to cause a motor to force the hydraulic pump (52) to cause hydraulic fluid to flow into the cylinder (60) to cause retraction of the piston (62) within the cylinder thereby forcibly pulling the back section (70) of the cradle (24) to force rotation of the cradle about the hinge (26) and movement of the rearmost ends of the tines upwardly to a transport position as shown in FIGS. 1 and 5. By moving the tines from a horizontal ground level position and as shown in FIG. 4 to an upwardly and rearwardly tilted position as shown in FIGS. 1 and 5 the weight of the bale is shifted rearwardly to a position supported by the elbow section (72). The shape and orientation of the cradle allows for no less clearance than is provided by the frame during transport on the highway or on back roads or in the field, and yet allows for ground-level horizontal orientation of the tines during loading and unloading. The use of a pair of small axles rather than a long single axle facilitates a desired weight distribution and a low cradle arrangement. When approaching the bale, the pickup truck operator originally places the tines in ground-level horizontal position by actuation of the control (58) to cause rotation of the cradle (24) to force the tines into the desired ground-level position. Although the trailer is preferably attached to a truck during use, it is to be understood that the trailer may be attached to any suitable vehicle such as a tractor. During rotation of the cradle from FIG. 4 to the position in FIG. 5 a retraction of the piston within the cylinder also necessitates the use of the pivots (66, 68) to accommodate the movement of the cradle about the hinge (26).

The present invention allows for the quick and easy and optionally repetitive movement of large bales of hay from a ground stored position to a loaded cradle position back to a ground stored position by the simple operation of the trailer by a pickup truck operator without the need of any undesired manual effort and even without the need for the truck operator to exit the cab of the pickup provided that the controls are positioned within the pickup.

What is claimed is:

1. A loading hay bale trailer for loading a hay bale comprising:
   (a) a carriage having
      (i) a frame having a rear end and a hitch for connecting to a vehicle attached at a front end,
      the frame including a pair of spaced apart frame members and a transverse member connecting the spaced apart frame members;
      (ii) axles attached to respective ones of said pair of spaced apart frame members proximate said rear end for carrying said frame, and
      (iii) wheels rotatingly attached to said axles for transporting said carriage,
   (b) a pivotal cradle for receiving the hay bale attached by a hinge located on the frame intermediate said axles and said front end, said cradle having
      (i) a back section having a portion upwardly extending from said hinge, and
      (ii) tines, and
   (c) forcing means for forcibly pivoting the cradle about said hinge, said forcing means being carried by an upstanding base structure member extending above said carriage and being attached to said cradle at said back section upwardly extending portion.

2. A loading hay bale trailer according to claim 1, further wherein said forcing means consists of a hydraulic-driven piston.

3. The trailer of claim 1 wherein said cradle has an elbow section for receiving the hay bale extending rearwardly from said back section, and said tines extending rearwardly from said elbow section.

4. A loading hay bale trailer according to claim 1, wherein each of said axles extends outwardly from an outer portion of said frame to said wheel to define a gap intermediate said axles and wherein further said tines are rotatably located to rotate within said gap to receive the hay bale therein.

5. A loading hay bale trailer according to claim 2, wherein said forcing means includes a remotely operable control means for controlling said forcing means.

* * * * *